United States Patent [19]

Tucholski

[11] Patent Number: 4,756,983
[45] Date of Patent: Jul. 12, 1988

[54] CELL CIRCUIT INTERRUPTER

[75] Inventor: Gary R. Tucholski, Parma, Ohio

[73] Assignee: Eveready Battery Company, St. Louis, Mo.

[21] Appl. No.: 123,750

[22] Filed: Nov. 23, 1987

[51] Int. Cl.$^4$ ............................................. H01M 2/34
[52] U.S. Cl. ......................................... 429/61; 429/7; 429/59
[58] Field of Search ................ 429/61, 7, 58, 56, 121, 429/122, 66

[56] References Cited

U.S. PATENT DOCUMENTS

| | | | |
|---|---|---|---|
| 3,676,221 | 7/1972 | Bach | 429/61 |
| 3,939,011 | 2/1976 | Zaleski | 429/7 |
| 4,025,696 | 5/1977 | Tucholski et al. | 429/61 |
| 4,028,478 | 6/1977 | Tucholski | 429/61 |
| 4,610,370 | 9/1986 | Patterson et al. | 429/56 |
| 4,690,879 | 9/1987 | Huhndorff et al. | 429/61 |

Primary Examiner—Donald L. Walton
Attorney, Agent, or Firm—Robert W. Welsh

[57] ABSTRACT

The invention relates to a galvanic cell having a failsafe circuit interrupter means for electrically isolating one terminal of the cell from the cell's electrochemical system when the closed end of the container bulges beyond a predetermined amount.

29 Claims, 3 Drawing Sheets

CELL CIRCUIT INTERRUPTER

FIELD OF THE INVENTION

The invention relates to a galvanic cell and more specifically to a galvanic cell having a failsafe circuit interruption means for electrically isolating one terminal of the cell from the cell's electrochemical system when the closed end of the container bulges beyond a predetermined amount.

BACKGROUND OF THE INVENTION

Cell manufacturers have used a number of approaches to resolve the problem of electrolyte expelled during venting which could occur during or after the cell has been exposed to abusive conditions. One of the most common methods of preventing seal rupture due to abuse charging or the like is to insert a diode in the battery's electrical circuit. By eliminating the possibility of charging the cells, internal gas is not generated and the seal never ruptures. Another electrically related mechanism is a belleville shape "flip switch". This device is triggered by bulging of the closed end of the cell's cylindrical container which causes a washer to invert and thereby break electrical contact. Another method involves the use of absorbents or electrolyte thickeners. The absorbent materials are usually located outside the seal area and beneath the cell's cover or jacket. As electrolyte escapes from a ruptured seal, the liquid is absorbed. Spew thickeners are mixed with the electrolyte and therefore are contained within the cell. The objective of the thickener is to slow down and/or absorb any leakage that may occur. The disadvantage of using either an absorbent or a thickener is that both materials tie up space that otherwise could be used for active materials of the cell. A third procedure is to use an outer container and end covers as an electrolyte containment system.

U.S. Pat. No. 3,676,221 discloses a battery comprising a plurality of stacked, disk-like sealed cells secured together by cups fitted over one cell and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U.S. Pat. No. 4,025,696 describes a disk shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell's electrical circuit when the bulge becomes excessive.

U.S. Pat. No. 3,081,366 describes a sealed cell having a metallic sheet member connected to one cell electrode and its periphery insulatingly affixed to an open casing end and an overlying exposed metallic terminal insulatingly held over the sheet member. A movable switch portion normally connects an intermediate pressure-deflectable sheet member portion to the external terminal and, in response to outward motion of the deflected sheet portion under excess internal pressure the switch portion disconnects the external terminal from the deflected sheet portion.

U.S. Pat. No. 3,373,057 describes a cell in which the cover of the casing of the cell is provided centrally with an inwardly concave-contact button. A dished (which is to say concaveconvex) snap-acting spring disc of the automatic reset type is marginally sealed to the inside of the cover. An automatic reset disc after snapping in one direction in response to pressure on its convex side will return with snap action when the pressure is relieved. The disc is provided centrally with a sealed movable contact for engagement and disengagement with an internal fixed contact when the disc snaps to and fro. The arrangement is such that when the contacts are engaged the disc is slightly sprung toward the cover but short of causing snap action. This maintains good electrical contact pressure under safe internal gas pressures. The fixed contact is electrically connected with one set of battery plates and the other set of plates is electrically connected with the casing.

U.S. Pat. No. 4,690,879 describes a cylindrical galvanic cell employing a unitary type cover as a failsafe circuit interruption means for electrically isolating one terminal of the cell from the cell's electrochemical system when the bottom of the cylindrical cell bulges beyond a predetermined amount so that the unitary cover breaks electrical contact with the housing of the cell.

It is therefore an object of this invention to provide a galvanic cell with means for electrically isolating one terminal of the cell from the cell's electrochemical system upon reaching a predetermined bulge in the cell's housing.

Another object of this invention is to provide means for electrically isolating one terminal of a galvanic cell from the cell's electrochemical system upon reaching a predetermined bulge in the cell's housing and that will occupy a minimum space requirement so as not to diminish the space allocated for the active components of the cell.

Another object of this invention is to provide a sealed galvanic cell with means for electrically isolating one terminal of the cell from the electrochemical system of the cell upon reaching a predetermined bulge in the cell's housing and that is easy to make, cost effective and easy to assemble.

The foregoing and additional objects will become more fully apparent from the following description and the accompanying drawing.

SUMMARY OF THE INVENTION

The invention relates to a sealed galvanic cell comprising a conductive container open at one end and closed at the opposite end and including in said container a positive electrode, a negative electrode and an electrolyte with said container being in electrical contact with one of said electrodes; a cover mounted over said open end of said conductive container, said cover being secured to and electrically insulated from said conductive container and in electrical contact with the other electrode; a conductive member, said conductive member comprising a central portion and a peripheral flange portion and said central portion being in electrical contact with said peripheral flange portion, said central portion being secured by electrically insulating means to the external central area of the closed end of said container with said peripheral flange portion being secured to and electrically connected to the external peripheral area of the closed end of said container thereby adapting said central portion of said conductive member as the terminal for the electrode in electrical contact with said container; and wherein said central portion will separate from said peripheral flange portion of said conductive member when the center area of the closed end of the container bulges a predetermined amount thereby electrically isolating the central portion terminal from the electrode in electrical contact with said container.

The galvanic cells of this invention will exhibit a substantial reduced occurrence of electrolyte leakage due to abusive charging or overdischarging, will not require an additional electrical component, are relatively simple to manufacture and will not occupy any usable space within the cell's interior.

DETAILED DESCRIPTION OF THE INVENTION

The conductive member could be composed of a central portion and a separate flange portion with the flange portion having a central opening that could accommodate the central portion in an interference fit arrangement. The central portion could be forced within the opening in the flange portion to form an intereference fit that could provide a suitable electrical contact between the central portion and the peripheral flange portion of the conductive member. In the operational mode, excessive bulge of the closed end of the container would be sufficient to move the central portion of the conductive member out of engagement with the peripheral flange portion thereby breaking the electrical contact therebetween. Since the central portion of the conductive member is secured to the bottom of the container by an electrically insulating adhesive, then the disengagement of the peripheral flange portion from the central portion will break the electrical contact between the central portion of the conductive member and the container of the cell thereby electrically isolating one terminal (central portion terminal) of the cell from the cell's electrochemical system.

The conductive member could be a unitary member comprising a central portion having an extending peripheral flange portion with the line of demarcation between said central portion and said peripheral flange portion being composed of a thin or weakened section in the material of the conductive member. This effectively produces a weakened line of demarcation between the central portion and the peripheral flange portion. In the operational mode, excessive bottom bulge of the container would be sufficient to move the central portion of the conductive member so as to break the central portion away from the peripheral flange portion of the conductive member at the weakened area forming the line of demarcation. Similar to the embodiment described above, this breaking of the electrical contact between the central portion and the peripheral flange portion of the conductive member will break the electrical contact between the central portion of the conductive member and the container of the cell thereby electrically isolating one terminal (central portion terminal) of the cell from the cell's electrochemical system.

An insulating securing means for securing the central portion to the bottom of the container could be an electrically nonconductive adhesive. Suitable nonconductive adhesives for this invention are acrylic type adhesives, epoxy type adhesives and cyanoacrylate type adhesives.

The electrically nonconductive adhesive should be applied so that it bonds the central portion of the conductive member to the bottom of the cell's container with sufficient strength to prevent tipping of the conductive member when the cell bulges. In addition, the nonconductive adhesive must allow for the electrical contact to be made between the bottom of the container and the peripheral flange portion of the conductive member. To maintain the electrical contact between the peripheral flange portion and the external peripheral area of the container, the peripheral flange portion of the conductive member could be welded to the bottom of the container using one or more welds or by using a suitable electrically conductive adhesive. Examples of suitable materials would include: acrylic type adhesive, epoxy type adhesives and cyanoacrylate type adhesives that have been mixed with an electrical conductor such as silver or graphite. It is important that the peripheral flange portion remain in contact with the bottom of the cell container so that the central portion moves outwardly and breaks the electrical connection between the central portion and the peripheral flange portion of the conductive member.

In the preferred embodiment, the container would be a cylindrical container, the electrically conductive means for securing the peripheral flange portion of the conductive member to the bottom of the container would be at least one weld, and the conductive member would comprise a disc-shaped central member with a peripheral flange portion that could function as a cover member for the cell. The simple design of the circuit interrupter means of this invention provides a number of unique features. First, when a nonconductive adhesive is employed to secure the central bottom of the conductive member to the central portion of the container, it can be easily and conventionally applied. Thus the circuit breaker means will require little or no additional space within the cell since the conductive member can function as a cover for the cell.

In the preferred embodiment, two or more welds between the peripheral flange portion and the container's bottom will be suitable. The electrically nonconductive adhesive for securing the central portion of the conductive member to the bottom of the container performs three functions. First, the adhesive holds the central portion substantially perpendicular to the cell's longitudinal axis during abusive charging so that the central portion will separate from the flange portion. Second, the adhesive electrically insulates the central portion from the bottom of the container after the central portion breaks away from the peripheral flange portion of the conductive member. Finally, the adhesive secures the parts of the cell together during normal handling and use.

The simple design of the circuit interrupter means of this invention provides a number of unique features. The circuit interrupter means can be incorporated into most cell constructions. The circuit interrupter means is generally irreversible such that the electrical connection between the conductive member and container is kept intact until the moment the central portion breaks away from the peripheral portion. This is a particularly desirable feature since many other circuit breaking mechanisms generally pass through an interim phase in which electrical contact is sporadic. This phenomenon could result in "chattering" at the point of contact. The circuit interrupter means is also inexpensive to manufacture since there are no costly parts to purchase. A small amount of a commercially available adhesive is the only component that must be added to most cell designs.

In the preferred embodiment, the one controlling characteristic for making the circuit interrupter work is the means used for electrically connecting the central portion to the peripheral flange portion of the conductive member. The means used should be sufficient to maintain normal electrical contact during storage and discharge and be adapted to break or separate the central portion from the peripheral flange portion of the conductive member when the cell bulges above a predetermined amount.

In some applications the control of the degree of bulge required to activate the circuit interrupter is critical. The circuit interrupter should not be activated by an amount of bulge that normally would occur when the cell is subject to high temperature storage. Thus the degree of bulge must be beyond the normal bulge that can be encountered in high temperature storage but below the degree of bulge caused by pressure buildup which will activate the vent and allow electrolyte to escape. For example, in a standard type alkaline D-size cylindrical cell (2.277 inches high and 1.318 inches diameter), the bottom of the container can bulge as much as 0.025 inch when stored at 71° C. for an eight (8) week period and can vent when the bulge exceeds 0.070 inch. Consequently, for this size and type cell system, the central portion should generally be designed to activate the circuit interrupter when the bulge is between about 0.030 and about 0.070 inch.

This invention is ideally suited for alkaline cells employing an MnO₂ positive electrode, a zinc negative electrode and an electrolyte solution comprising potassium hydroxide.

The present invention will become more apparent from the following description thereof when considered together with the accompanying drawing which is set forth as being exemplary of the present invention and is not intended to be limitative thereof in any respect.

Figure 1:
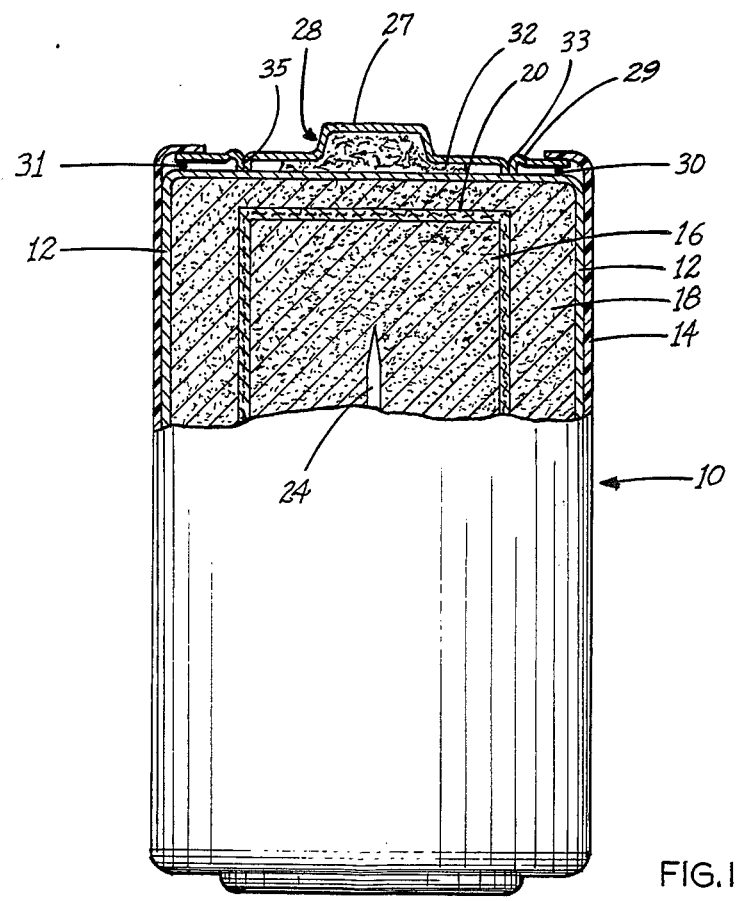
FIG. 1 is an elevational view partially in cross-section of an alkaline manganese dioxide zinc cell embodying a circuit interrupter means of the present invention.
Figure 2:
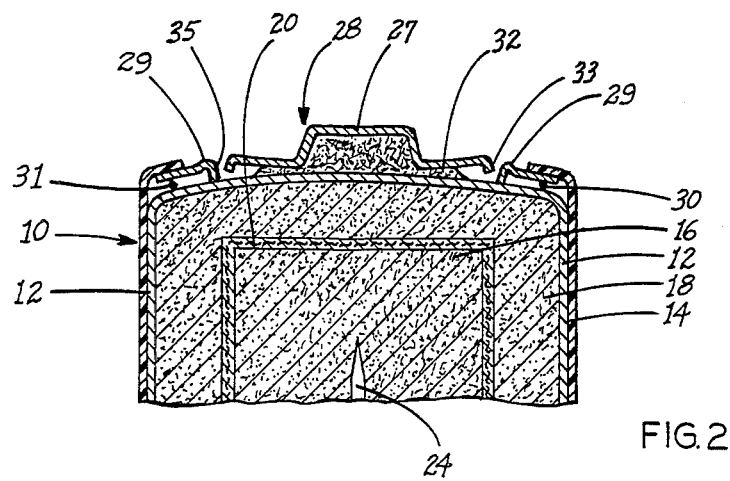
FIG. 2 is an elevational view of part of the cell in FIG. 1 showing the rim of the central portion of the cover separated from the peripheral flange portion.

Referring now to the drawing and particularly to FIGS. 1 and 2 inclusive in which a typical alkaline galvanic cell 10 of the present invention is shown comprising an inverted-metallic cupped container 12 provided with an outer plastic shrink label 14. Disposed within the container 12 is an anode 16, a cathode 18, a separator 20 and an alkaline electrolyte which permeates the anode 16, cathode 18, and separator 20 respectively. An anode current pin type collector 24 extends lengthwise within the cell 10, parallel to the longitudinal axis of the cell, from a location in contact with the anode 16 to the negative end 26 of the cell 10 where it terminates.

A cup-shaped conductive cover 28 comprising a central portion 27 and a peripheral portion 29, said peripheral portion 29 is shown spot welded 30-31 to the bottom of container 12. Central portion 27 of cover 28 is force fitted within peripheral flange portion 29 to provide an interference fit that insures good electrical contact between said central portion 27 and said peripheral flange portion 29. The peripheral flange portion 29 has a small vertical extending skirt 35 that mates in frictional relationship with a vertical extending skirt 33 extending from the central portion 27. The skirts could form a continuous depending flange or could be separate depending tabs disposed about the peripheral of central portion 27 or about the inner wall of peripheral flange portion 29. Prior to welding the peripheral flange portion 29 of cover 28 to container 12, an electrically nonconductive adhesive 32 is placed between the bottom of container 12 and the central portion 27 of cover 28 over an area sufficient so that only the inner central area of central portion 27 of cover 28 will contact the electrically nonconductive adhesive 32 thereby leaving the peripheral flange portion 29 of cover 28 in electrical contact with container 12. Peripheral flange portion 29 of cover 28 is welded (30-31) to container 12 to assure good electrical contact between these components.

After a predetermined amount of bulge occurs that is designed to move the central portion 27 from within peripheral flange portion 29, the contact between the central portion 27 and the peripheral portion 29 will be broken. As is evident from FIG. 2, central portion 27 of cover 28 is still secured to container 12 via electrically nonconductive adhesive 32 but its electrical contact to peripheral flange portion 29 is broken thereby electrically isolating central portion 27 from the container 12. By designing the cover as to its size, material and the like, this invention can effectively isolate the central portion terminal 27 from the circuit of the cell prior to the cell venting or rupturing.

Figure 3:
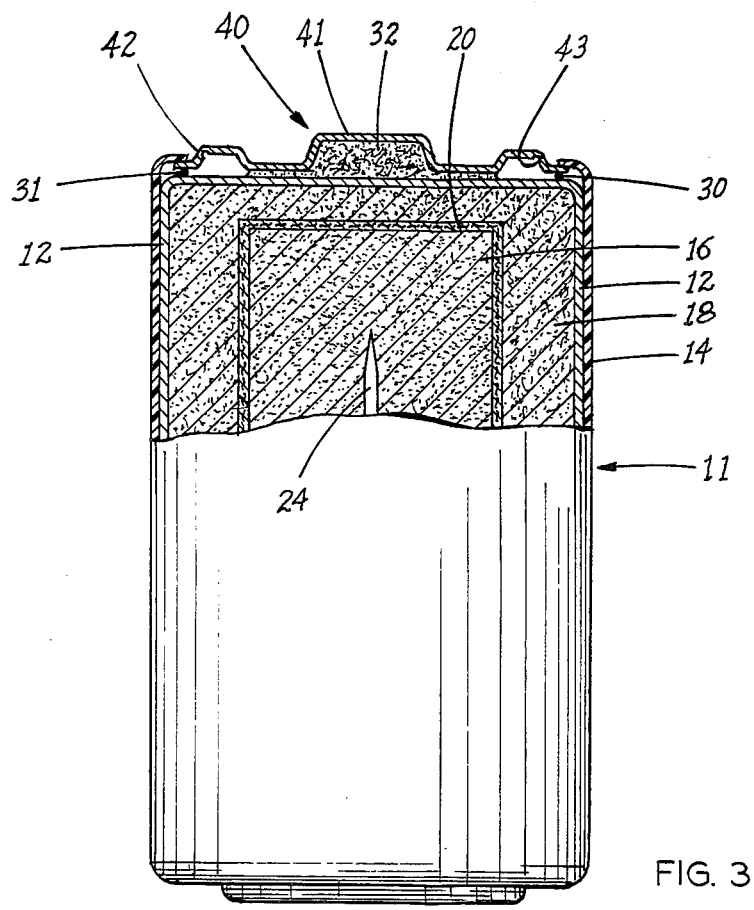
FIG. 3 is an elevational view partially in cross-section of another alkaline manganese dioxide zinc cell embodying a circuit interrupter means of the present invention.
Figure 4:
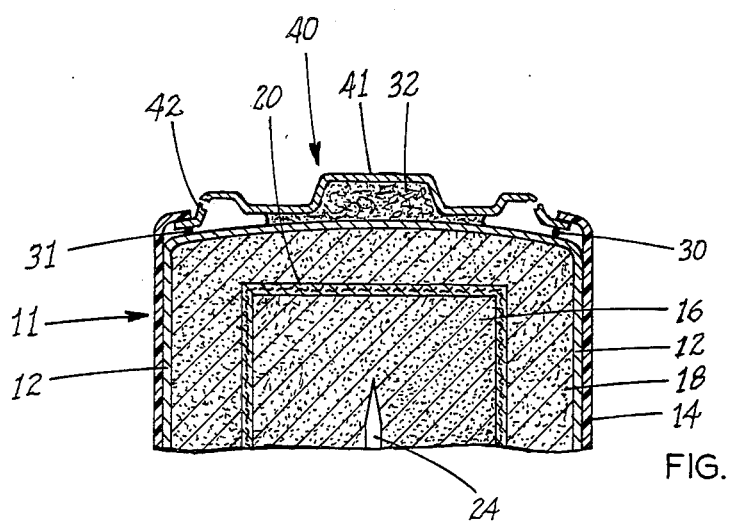
FIG. 4 is an elevational view of part of the cell in FIG. 3 showing the cover's central portion separated from the cover's peripheral portion.
Figure 5A:
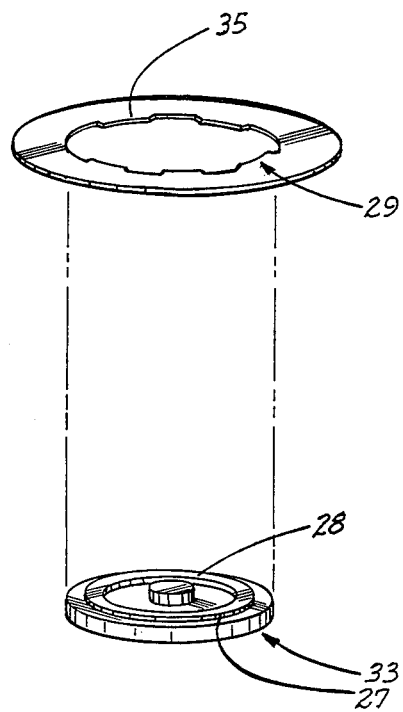
FIG. 5a is a view of the central portion distinct from the peripheral portion of the circuit interrupter shown in FIGS. 1 and 2 useful in this invention.
Figure 3A:
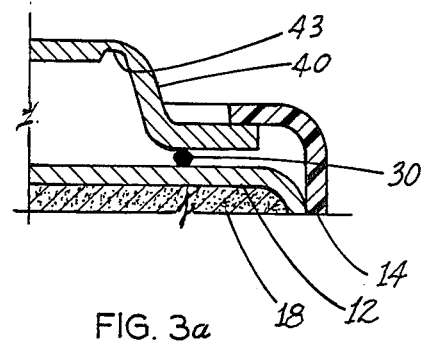
FIG. 3a is a cross-sectional view taken along line a—a showing the line of demarcation between the center and peripheral portion of the circuit interrupter.
Figure 5B:
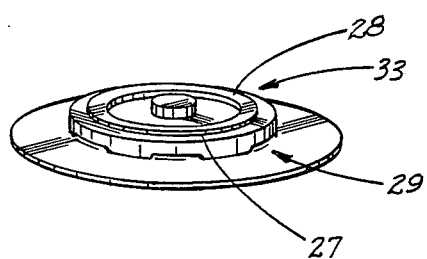
FIG. 5b is a view of the assembled circuit interrupter.

FIGS. 3 and 4 show another embodiment of the invention of an alkaline galvanic cell similar to that shown in FIGS. 1 and 2 except that a different cup-shaped cover 28 is employed. Similar component parts of the cell shown in FIGS. 1 and 2 and FIGS. 3 and 4 have been identified with identical reference numbers. Specifically, FIGS. 3 and 4 show an alkaline galvanic cell 11 comprising an inverted metallic cupped container 12 provided with an outer plastic shrink label 14. Disposed within the container 12 is an anode 16, a cathode 18, and a separator 20 and an alkaline electrolyte which permeates the anode 16, cathode 18, and separator 20, respectively. An anode current pin type collector 24 extends lengthwise within the cell 11, parallel to the longitudinal axis of the cell, from a location in contact with the anode 16 to the negative end 26 of the cell 11 where it terminates.

A unitary cup-shaped conductive cover 40 comprising a central portion 41 and a peripheral flange portion 42 is shown with peripheral flange portion 42 spot welded 30-31 to the bottom of container 12. Circular groove 43 forms a line of demarcation between central portion 41 and peripheral flange portion 42, said line of demarcation forming a weakened area in the material of the cover 40 so that central portion 41 could move outwardly and break along said line of demarcation when it is subjected to a predetermined amount of displacement. This will electrically isolate central portion 41 from peripheral flange portion 42. Prior to welding the peripheral flange portion 42 of cover 40 to container 12, an electrically nonconductive adhesive 32 is placed between the bottom of container 12 and the central portion 41 of cover 40 over an area sufficient so that only the inner central area of central portion 41 of cover 40 will contact the electrically nonconductive adhesive 32 thereby leaving the peripheral flange portion 42 of cover 40 in electrical contact with container 12. Peripheral flange portion 42 of cover 40 is welded (30-31) to container 12 to assure good electrical contact between these components.

After a predetermined amount of bulge occurs that is designed to break the central portion 41 away from peripheral flange portion 42, the electrical connection between the central portion 41 and the peripheral portion 42 will be broken. As is evident from FIG. 4, central portion 41 of cover 40 is still secured to container 12 via electrically nonconductive adhesive 32 but its electrical contact to peripheral flange portion 42 is broken thereby electrically isolating central portion 41 from the container 12. By designing the cover as to its size, line of demarcation, material and the like, this invention can effectively isolate the central portion 41 (terminal cover) from the circuit of the cell prior to the cell venting or rupturing.

Although the present invention has been described with reference to particular details, it is not intended that these details shall be construed as limiting the scope of this invention.

What is claimed:

1. A galvanic cell comprising a conductive container open at one end and closed at the opposite end and including in said container a positive electrode, a negative electrode and an electrolyte with said container being in electrical contact with one of said electrodes; a cover mounted over said open end of said conductive container, said cover being secured to and electrically insulated from said conductive container and in electrical contact with the other electrode; a conductive member, said conductive member comprising a central portion and a peripheral flange portion and said central portion being in electrical contact with said peripheral flange portion, said central portion being secured by electrically insulating means to the external central area of the closed end of said container with said peripheral flange portion being secured to and electrically connected to the external peripheral area of the closed end of said container thereby adapting said central portion of said conductive member as the terminal for the electrode in electrical contact with said container; and wherein said central portion will separate from said peripheral flange portion of the said conductive member when the center area of the closed end of said container bulges a predetermined amount thereby electrically isolating the central portion terminal from the electrode in electrical contact with said container.

2. The galvanic cell of claim 1 wherein said conductive member comprises a central portion and a separate peripheral flange portion and wherein said central portion is force fitted within the peripheral flange portion to provide an interference fit and thereby insure a good electrical contact between said central portion and said peripheral portion.

3. The galvanic cell of claim 1 wherein said conductive member is a unitary member comprising a central portion having an extending peripheral flange portion and a line of demarcation between the central portion and the peripheral flange portion being weakened so as to be adaptable to break upon a predetermined displacement.

4. The galvanic cell of claim 3 wherein the line of demarcation is a groove in the material of the conductive member.

5. The galvanic cell of claim 3 wherein the line of demarcation is formed from perforations in the material of the conductive member.

6. The galvanic cell of claim 1, wherein an electrically nonconductive adhesive is used to secure the central portion of the conductive member to the external central area of the bottom of the container.

7. The galvanic cell of claim 1, wherein said peripheral flange portion is welded to the bottom of the container.

8. The galvanic cell of claim 1, wherein said container is a cylindrical container and said central portion of said conductive member acts as a terminal for the cell.

9. The galvanic cell of claim 1, wherein said container is in electrical contact with said positive electrode and said cover electrically insulated from the container is in electrical contact with said negative electrode.

10. The galvanic cell of claim 1, wherein said container is in electrical contact with said negative electrode and said cover electrically insulated from the container is in electrical contact with said positive electrode.

11. The galvanic cell of claim 1, where said positive electrode is $MnO_2$, said negative electrode is zinc and said electrolyte solution comprises potassium hydroxide.

12. The galvanic cell of claim 1, wherein said central portion of the conductive member is secured to the bottom of the container using an electrically nonconductive adhesive and said peripheral flange portion of the conductive member is welded to the bottom of the container.

13. The galvanic cell of claim 12, wherein the container is in electrical contact with said positive electrode and said cover electrically insulated from the container is in electrical contact with said negative electrode.

14. The galvanic cell of claim 2, wherein an electrically nonconductive adhesive is used to secure the central portion of the conductive member to the external central area of the bottom of the container.

15. The galvanic cell of claim 2, wherein said peripheral flange portion is welded to the bottom of the container.

16. The galvanic cell of claim 2, wherein said container is a cylindrical container and said central portion of said conductive member acts as a terminal for the cell.

17. The galvanic cell of claim 2, wherein said container is in electrical contact with said positive electrode and said cover electrically insulated from the container is in electrical contact with said negative electrode.

18. The galvanic cell of claim 2, wherein said container is in electrical contact with said negative electrode and said cover electrically insulated from the container is in electrical contact with said positive electrode.

19. The galvanic cell of claim 2, where said positive electrode is $MnO_2$, said negative electrode is zinc and said electrolyte solution comprises potassium hydroxide.

20. The galvanic cell of claim 2, wherein said central portion of the conductive member is secured to the bottom of the container using an electrically nonconductive adhesive and said peripheral flange portion of the conductive member is welded to the bottom of the container.

21. The galvanic cell of claim 13, wherein the container is in electrical contact with said positive electrode and said cover electrically insulated from the container is in electrical contact with said negative electrode.

22. The galvanic cell of claim 3, wherein an electrically nonconductive adhesive is used to secure the central portion of the conductive member to the external central area of the bottom of the container.

23. The galvanic cell of claim 3, wherein said peripheral flange portion is welded to the bottom of the container.

24. The galvanic cell of claim 3, wherein said container is a cylindrical container and said central portion of said conductive member acts as a terminal for the cell.

25. The galvanic cell of claim 3, wherein said container is in electrical contact with said positive electrode and said cover electrically insulated from the container is in electrical contact with said negative electrode.

26. The galvanic cell of claim 3, wherein said container is in electrical contact with said negative electrode and said cover electrically insulated from the container is in electrical contact with said positive electrode.

27. The galvanic cell of claim 3, where said positive electrode is $MnO_2$, said negative electrode is zinc and said electrolyte solution comprises potassium hydroxide.

28. The galvanic cell of claim 3, wherein said central portion of the conductive member is secured to the bottom of the container using an electrically nonconductive adhesive and said peripheral flange portion of the conductive member is welded to the bottom of the container.

29. The galvanic cell of claim 28, wherein the container is in electrical contact with said positive electrode and said cover electrically insulated from the container is in electrical contact with said negative electrode.

* * * * *